United States Patent [19]

Kikuchi

[11] Patent Number: 5,137,794

[45] Date of Patent: Aug. 11, 1992

[54] ELECTROPHOTOGRAPHIC PHOTOSENSITIVE MEMBER, ELECTROPHOTOGRAPHIC APPARATUS AND FACSIMILE WHICH EMPLOY THE SAME

[75] Inventor: Toshihiro Kikuchi, Kanagawa, Japan

[73] Assignee: Canon Kabushiki Kaisha, Tokyo, Japan

[21] Appl. No.: 714,032

[22] Filed: Jun. 12, 1991

[30] Foreign Application Priority Data

Jun. 13, 1990 [JP] Japan .................. 2-152871

[51] Int. Cl.$^5$ ............... G03G 15/00; G03G 15/02; G03G 5/00; C07C 245/00
[52] U.S. Cl. ................... 430/56; 430/57; 430/70; 430/71; 430/72; 430/75; 534/560
[58] Field of Search ............. 430/56, 57, 70, 71, 430/72, 75; 534/560

[56] References Cited

U.S. PATENT DOCUMENTS

| | | | |
|---|---|---|---|
| 4,299,896 | 11/1981 | Hashimoto et al. | 430/58 |
| 4,666,805 | 5/1987 | Hashimoto | 430/57 |
| 4,708,921 | 11/1987 | Hashimoto | 430/70 |

FOREIGN PATENT DOCUMENTS

| | | |
|---|---|---|
| 54-22834 | 2/1979 | Japan . |
| 60-131539 | 7/1985 | Japan . |
| 61-215556 | 9/1986 | Japan . |
| 61-241763 | 10/1986 | Japan . |
| 63-024261 | 2/1988 | Japan ............ 430/72 |
| 63-158561 | 7/1988 | Japan . |

Primary Examiner—Marion E. McCamish
Assistant Examiner—S. C. Crossan
Attorney, Agent, or Firm—Fitzpatrick, Cella, Harper & Scinto

[57] ABSTRACT

An electrophotographic photosensitive member having a conductive substrate and a photosensitive layer thereon. The photosensitive layer contains a compound represented by the following formula (1):

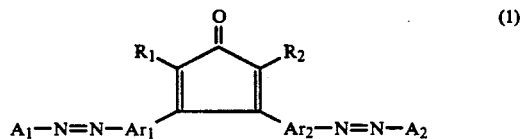

wherein $Ar_1$ and $Ar_2$ are the same or different and are each a substituted or unsubstituted bivalent carbocyclic aromatic group or a substituted or unsubstituted bivalent heterocyclic aromatic group; $R_1$ and $R_2$ are each a hydrogen atom, a substituted or unsubstituted alkyl group, a substituted or unsubstituted aralkyl group or a substituted or unsubstituted aryl group; and $A_1$ and $A_2$ are each a coupler residue having a phenolic hydroxyl group, wherein $A_1$ and $A_2$ are the same or different.

10 Claims, 1 Drawing Sheet

ELECTROPHOTOGRAPHIC PHOTOSENSITIVE MEMBER, ELECTROPHOTOGRAPHIC APPARATUS AND FACSIMILE WHICH EMPLOY THE SAME

BACKGROUND OF THE INVENTION

1. Field of the Invention

The present invention relates to an electrophotographic photosensitive member, and more particularly, to an electrophotographic photosensitive member having a photosensitive layer in which a disazo pigment having a specific structure is present, as well as an electrophotographic apparatus and a facsimile which employ such an electrophotographic photosensitive member.

2. Description of the Related Art

Typical examples of the organic photoconductive substances for use in an electrophotographic photosensitive member include: photoconductive polymers, such as poly-N-vinyl carbazole; low-molecular organic photoconductive substances, such as 2, 5-bis (p-diethylaminophenyl)-1, 3 and 4-oxadiazole; and various combinations of such organic photoconductive substances and dyes or pigments.

Electrophotographic photosensitive members which employ such organic photoconductive substances have advantages in that productivity is high, that they are inexpensive, and that color sensitivity thereof can be freely controlled by selecting the pigment or dye used. Therefore, research has heretofore been conducted on electrophotographic photosensitive members. The function separation type photosensitive member has been developed in which a charge generating layer containing an organic photoconductive dye or pigment and a charge transporting layer containing any of the above described photoconductive polymers or low-molecular organic photoconductive substances are disposed as a laminate. Accordingly, the sensitivity and durability of the conventional organic photoelectric photosensitive members have thus been improved greatly.

Among organic conductive substances, azo pigments in general exhibit excellent photoconductivity. Compounds exhibiting the desired characteristics can be produced relatively easily by combining azo components with coupler components. Therefore, various types of compounds have heretofore been proposed. Such compounds are disclosed in, for example, Japanese Patent Laid-Open Nos. 22834/1979, 131539/1985, 215556/1986, 241763/1986, 24261/1988 and 158561/1988.

In recent years, there has been a demand for a higher image quality. To meet this demand, organic photoconductive substances which can provide an electrophotographic photosensitive member exhibiting higher sensitivity and more stable potential characteristics have been desired.

SUMMARY OF THE INVENTION

An object of the present invention is to provide an electrophotographic photosensitive member having a photosensitive layer in which a new photoconductive material is present.

An object of the present invention is to provide an electrophotographic photosensitive member which maintains excellent sensitivity and stable potential characteristics even when it is used repetitively.

An object of the present invention is to provide an electrophotographic apparatus and a facsimile which have the above-described electrophotographic photosensitive member.

To this end, the present invention provides an electrophotographic photosensitive member, which comprises a conductive substrate and a photosensitive layer thereon. The photosensitive layer contains a compound represented by the following formula (1):

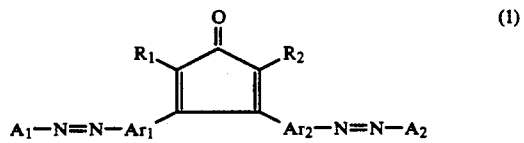

wherein $Ar_1$ and $Ar_2$ are the same or different and are each a substituted or unsubstituted bivalent carbocyclic aromatic group or a substituted or unsubstituted bivalent heterocyclic aromatic group; $R_1$ and $R_2$ are each a hydrogen atom, a substituted or unsubstituted alkyl group, a substituted or unsubstituted aralkyl group or a substituted or unsubstituted aryl group; and $A_1$ and $A_2$ are each a coupler residue having a phenolic hydroxyl group, wherein $A_1$ and $A_2$ are the same or different.

The present invention further provides an electrophotographic apparatus and a facsimile which have the aforementioned electrophotographic photosensitive member.

The above and other objects, features and advantages of the present invention will become clear from the following description of the preferred embodiments.

DETAILED DESCRIPTION OF THE INVENTION

Figure 1:
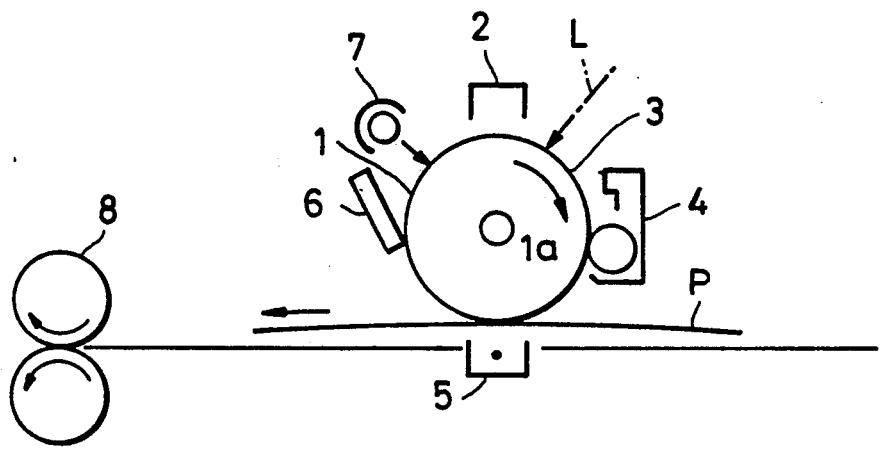
FIG. 1 is a schematic view of an electrophotographic apparatus having an electrophotographic photosensitive member according to the present invention.

The electrophotographic photosensitive member according to the present invention has a photosensitive layer in which a disazo pigment expressed by the formula (1) is present.

In the formula (1), $Ar_1$ and $Ar_2$ may be a residue or a group obtained by removing two hydrogen atoms from a carbocyclic aromatic ring, such as benzene, naphthalene or anthracene nucleus, or a group obtained by removing two hydrogen atoms from a heterocyclic aromatic nucleus, such as furan, pyrrole carboxylic acid, thiophene, pyridine or pyragine ring. Examples of the substituents which may be possessed by $Ar_1$ and $Ar_2$ include: a halogen atom, such as a fluorine, chlorine, iodine or bromine atom; an alkyl group, particularly a lower alkyl, especially a $C_1$–$C_4$ alkyl group, such as a methyl, ethyl, propyl, isopropyl or butyl group; an alkoxy group, such as a lower alkoxy, such as methoxy, ethoxy or propoxy group; an allyloxy group, such as a phenoxy group; a nitro group; a cyano group; and a substituted amino group, such as a dimethyl amino, dibenzyl amino, diphenyl amino, morpholino, piperidino or pyrrolidino group. Ar₁ and Ar₂ may be the same or different from each other.

R₁ and R₂ may each be an alkyl group, especially a lower alkyl group, such as a methyl, ethyl, propyl, isopropyl, n-butyl, sec-butyl or tert-butyl group; an aralkyl group, such as a benzyl or phenothyl group; or an aromatic group, such as a phenyl or naphthyl group.

Examples of the substituents that can be possessed by R₁ and R₂ include: a halogen atom, such as a fluorine, chlorine, iodine or bromine atom; an alkyl group, particularly a lower alkyl group, such as a methyl, ethyl, propyl, isopropyl or butyl group; an alkoxy group, especially a lower alkoxy group, such as a methoxy, ethoxy or propoxy group; an allyloxy group, such as a phenoxy group; a nitro group; a cyano group; and a substituted amino group, such as a dimethyl amino, dibenzyl amino, diphenyl amino, morpholino, piperidino or pyrrolidino group.

R₁ and R₂ may be the same or different from each other.

Suitable examples of A₁ and A₂ include coupler residues expressed by the following formulas (2) to (6).

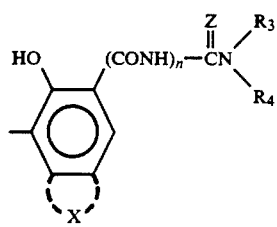

Formula (2)

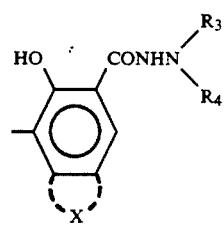

Formula (3)

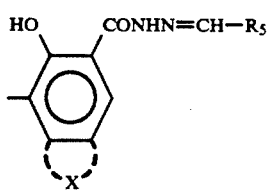

Formula (4)

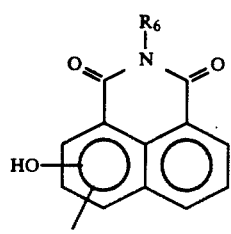

Formula (5)

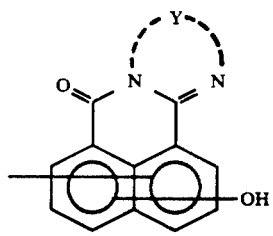

Formula (6)

X in formulas (2), (3) and (4) represents a residue forming a polycyclic aromatic ring with a benzene ring, such as a naphthalene ring which may have a substituent, an anthracene ring which may have a substituent, a carbazole ring which may have a substituent, a benzcarbazole ring which may have a substituent or a dibenzofuran ring which may have a substitutent, or with a heterocyclic ring.

Y in formula (6) represents a bivalent aromatic hydrocarbon group which may have a substituent or a bivalent heterocyclic group which has a nitrogen atom in its ring and which may have a substituent. Examples of such groups include bivalent groups, such as o-phenylene, o-naphthylene, perinaphthylene, 1, 2-anthrylene, 3, 4-pyrazoldiyl, 2, 3-pyridirediyl, 4, 5-pyridinediyl, 6, 7-indazolediyl and 6, 7-quinolinediyl.

R₃ and R₄ in formulas (2) and (3) represent a hydrogen atom, an alkyl group, particularly a lower alkyl group, which may have a substituent, an aryl group which may have a substituent, an aralkyl group which may have a substituent, or a polycyclic group which may have a substituent R₃ and R₄ may be the same or different from each other. R₃ and R₄ may be bonded to form a cyclic amino group having a nitrogen atom in its ring.

R₅ in formula (4) represents a hydrogen atom, an alkyl group, especially a lower alkyl group, which may have a substituent, an aryl group which may have a substituent, an aralkyl group which may have a substituent, or a heterocyclic group which may have a substituent.

R₆ in formula (5) represents a hydrogen atom, an alkyl group, preferably a lower alkyl group, which may have a substituent, an aryl group which may have a substituent, an aralkyl group which may have a substituent, or a heterocyclic group which may have a substituent.

The above-described alkyl group may be a methyl, ethyl or propyl group; the aryl group may be a phenyl, naphthyl or anthryl group; the aralkyl group may be a benzyl or phenethyl group; the heterocyclic group may be a pyridyl, thienyl, carbazole, benzoimidazolyl or benzothiazolyl group; the cyclic amino group having a nitrogen atom in its ring may be a pyrrole, pyrroline, pyrrolidine, pyrrolidone, indole, indoline, carbazcle, imidazole, pyrazole, pyrazoline, oxazine or phenoxazine group.

Examples of the substituents that can be possessed by the above-described groups include a halogen atom, such as a fluorine, chlorine, iodine or bromine atom; an alkyl group, especially a lower alkyl group, such as a methyl, ethyl or propyl group; an alkoxy group, such as a methoxy or ethoxy group; an alkylamino group, such as a dimethylamino or diethylamino group; a phenylcarbamoyl group; a nitro group; a cyano group; and a halomethyl group, such as a trifluoromethyl group.

Z in formula (2) represents an oxygen or sulfur atom, and n is either 0 or 1.

Among the disazo pigments expressed by formula (1), pigments in which $A_1$ and $A_2$ may be the same or different from each other, and they are represented by formula (2), (3) or (4) and in which X represents a residue forming a benzocarbazole ring are particularly suitable as the charge generating substance for semiconductor lasers because their absorbing area is widened in the vicinity of the near infrared area.

Practical examples of the disazo pigments expressed by formula (1) of the present invention are shown below. However, the disazo pigments used in the present invention are not limited to those.

In the following examples, the basic structure is shown first, and then the portions thereof which vary are shown as the examples.

Basic structure

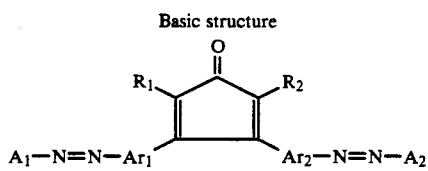

Pigment example (1)

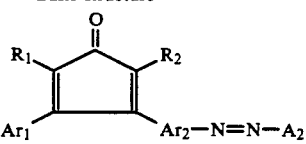

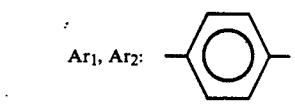

$R_1, R_2$ : —H

Pigment example (2)

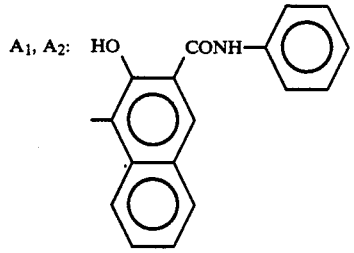

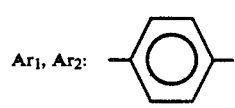

$R_1, R_2$: —CH₃

Pigment example (3)

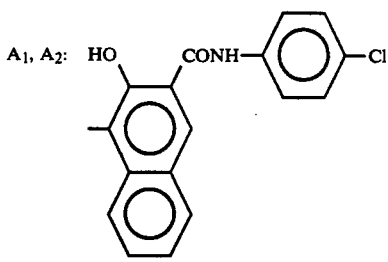

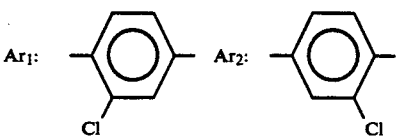

$R_1, R_2$: —CH₃

Pigment example (4)

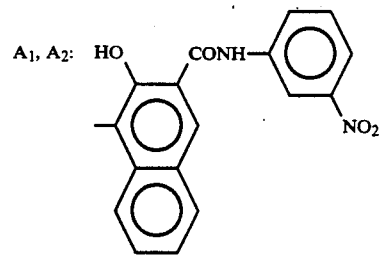

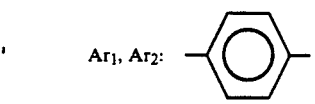

$R_1, R_2$: —C₂H₅

Pigment example (5)

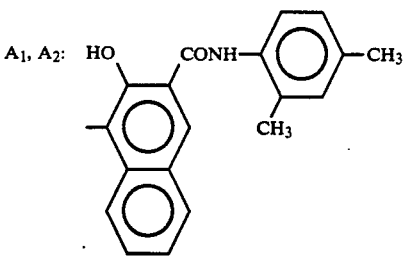

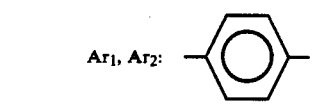

$R_1, R_2$: —C₂H₅

Pigment example (6)

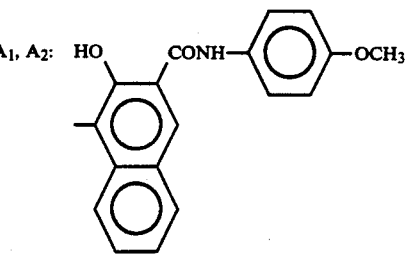

Ar₁, Ar₂: 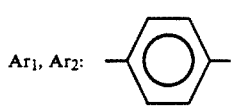
R₁, R₂: —H
Pigment example (7)
A₁, A₂: 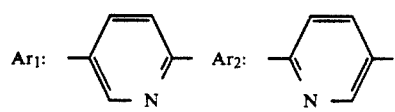
Ar₁: 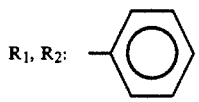 Ar₂: 
R₁, R₂: 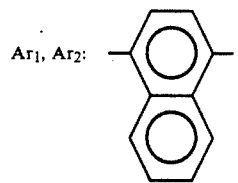
Pigment example (8)
A₁, A₂: 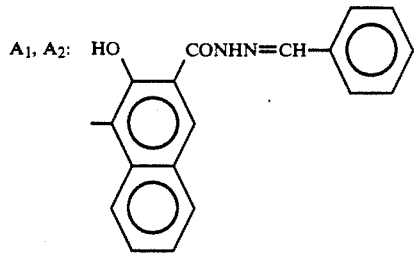
Ar₁, Ar₂: 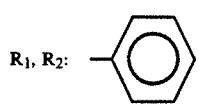
R₁, R₂: 
Pigment example (9)
A₁, A₂: 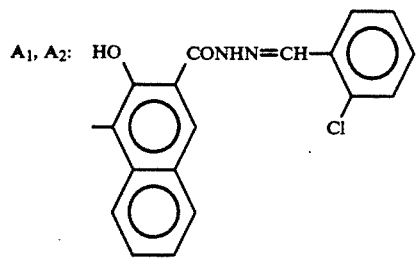
Ar₁, Ar₂: 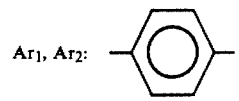
R₁, R₂: 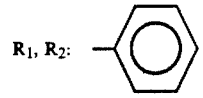
Pigment example (10)
A₁, A₂: 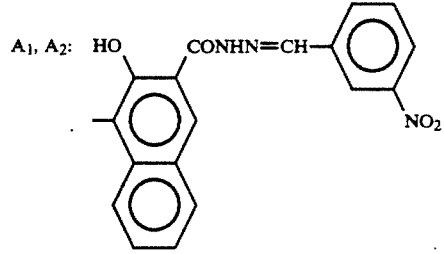
Ar₁, Ar₂: 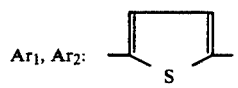
R₁, R₂: —CH₃
Pigment example (11)
A₁, A₂: 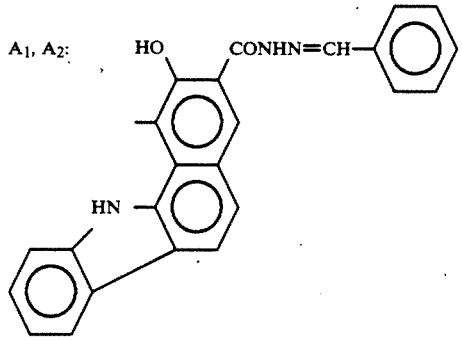
Ar₁, Ar₂: 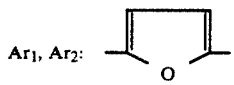
R₁, R₂: —CH₂— 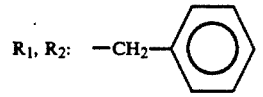
Pigment example (12)
A₁, A₂: 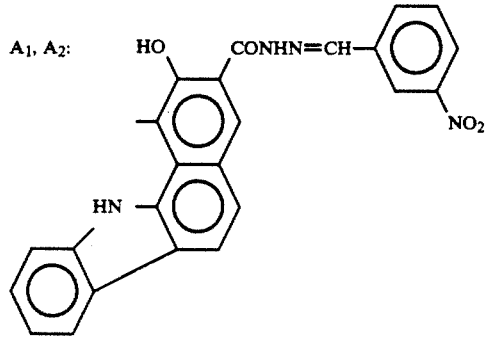

-continued

Ar₁, Ar₂:

(pyrrole with N-C₂H₅)

R₁, R₂: —H

Pigment example (13)

A₁, A₂: (3-hydroxy-2-naphthoic acid anilide with methyl)
HO, CONHN—phenyl

Ar₁, Ar₂: (phenyl)

R₁, R₂: (tolyl, —CH₃)

Pigment example (14)

A₁, A₂: HO, CONH—(2-chlorophenyl), anthracene system

Ar₁, Ar₂: (phenyl)

R₁, R₂: (tolyl, —CH₃)

Pigment example (15)

A₁, A₂: N-ethyl naphthalimide with OH

-continued

Ar₁, Ar₂: (phenyl)

R₁, R₂: —H

Pigment example (16)

A₁, A₂: N-methyl naphthalimide with OH

Ar₁, Ar₂: (naphthyl)

R₁, R₂: —H

Pigment example (17)

A₁, A₂: N-ethyl naphthalimide with HO

Ar₁, Ar₂: (phenyl)

R₁, R₂: —CH₃

Pigment example (18)

A₁, A₂: N-methyl naphthalimide with HO

Ar₁, Ar₂: (naphthyl)

R₁, R₂: —CH₃

Pigment example (19)

-continued

A₁, A₂: [2-phenyl-benzimidazolone fused naphthalenone with OH and methyl]

Ar₁, Ar₂: [anthracene]

R₁, R₂: [phenyl]

Pigment example (20)

A₁, A₂: [2-phenyl-benzimidazolone fused naphthalenone with HO and methyl]

Ar₁, Ar₂: [anthracene]

R₁, R₂: [phenyl]

Pigment example (21)

-continued

A₁, A₂: [2-phenyl-benzimidazolone fused naphthalenone with OH and methyl]

Ar₁, Ar₂: [pyrazine]

R₁, R₂: —H

Pigment example (22)

A₁, A₂: [HO, CONH-phenyl-CF₃, methyl, HN-carbazole naphthalene]

Ar₁, Ar₂: [phenyl]

R₁, R₂: [phenyl]

Pigment example (23)

A₁, A₂: [HO, CONHCONH-phenyl-Cl, methyl, HN-carbazole naphthalene]

Ar₁, Ar₂: [phenyl]

R₁, R₂: —H

-continued
Pigment example (24)
$A_1, A_2$: 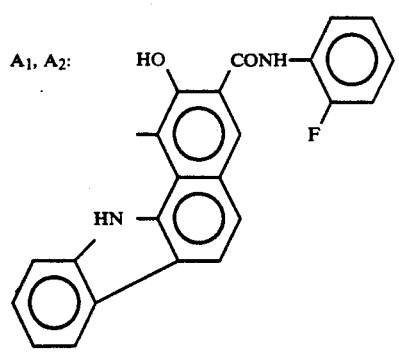
$Ar_1, Ar_2$: 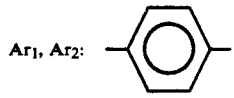
$R_1, R_2$: —H
Pigment example (25)
$A_1, A_2$: 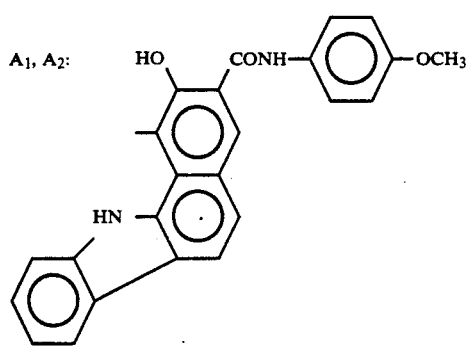
$Ar_1, Ar_2$: 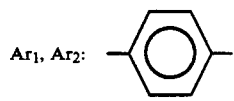
$R_1, R_2$: —CH$_3$
Pigment example (26)
$A_1, A_2$: 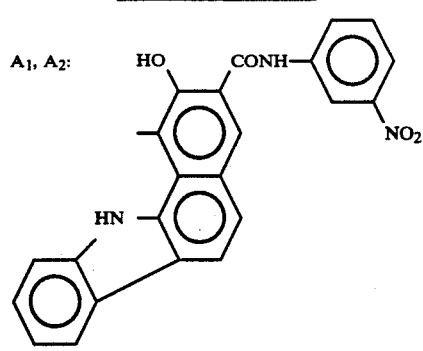
$Ar_1, Ar_2$: 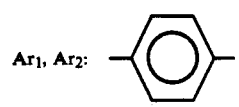
$R_1, R_2$: 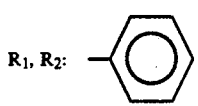
-continued
Pigment example (27)
$A_1, A_2$: 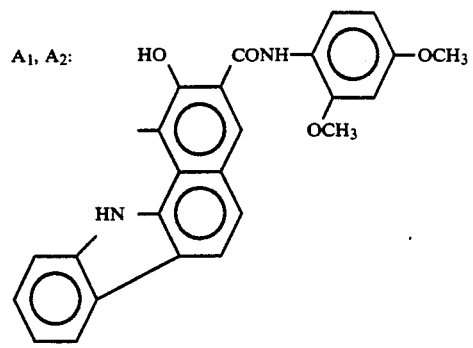
$Ar_1, Ar_2$: 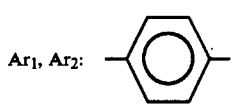
$R_1, R_2$: 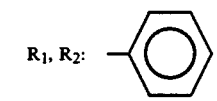
Pigment example (28)
$A_1, A_2$: 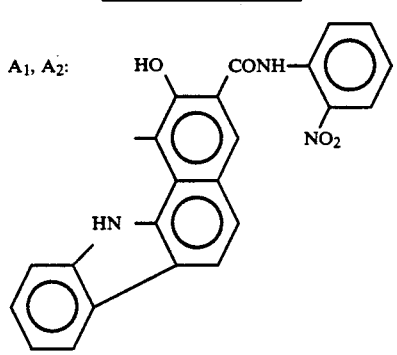
$Ar_1, Ar_2$: 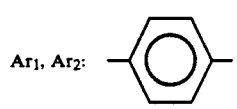
$R_1, R_2$: 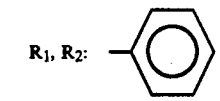
Pigment example (29)
$A_1, A_2$: 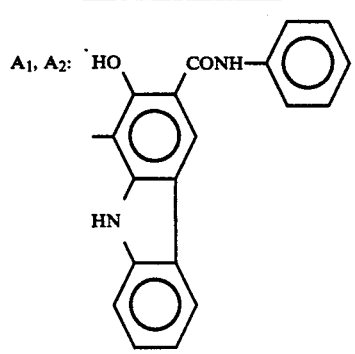

Ar₁, Ar₂: 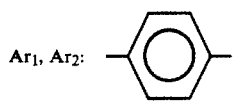
R₁, R₂: 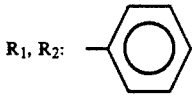
Pigment example (30)
A₁, A₂: 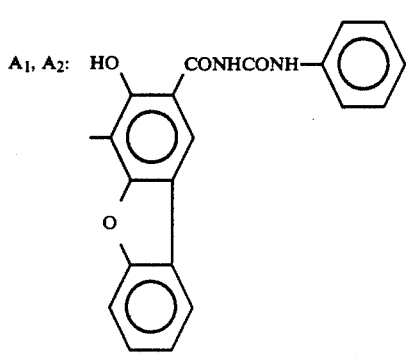
Ar₁, Ar₂: 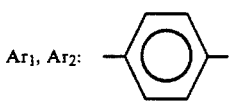
R₁, R₂: 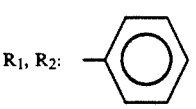
Pigment example (31)
A₁, A₂: 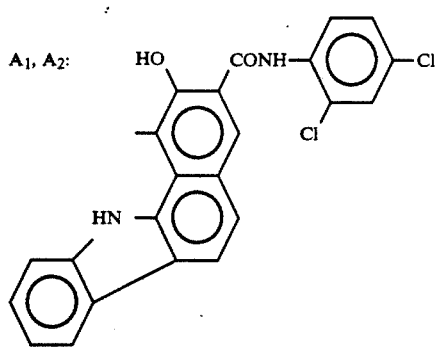
Ar₁, Ar₂: 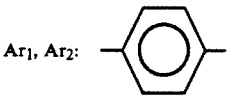
R₁, R₂: 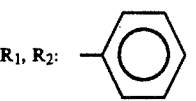
Pigment example (32)
A₁, A₂: 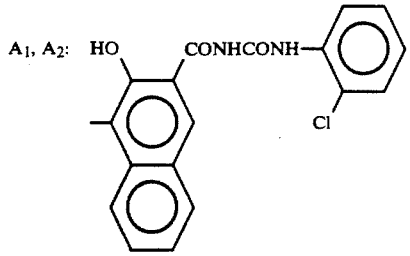
Ar₁, Ar₂: 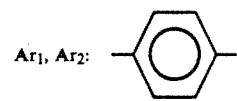
R₁, R₂: —CH₃
Pigment example (33)
A₁, A₂: 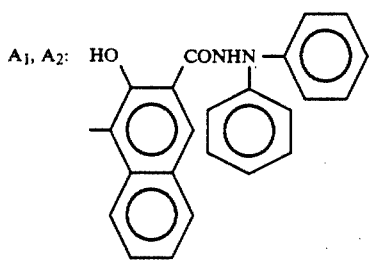
Ar₁, Ar₂: 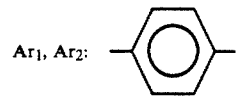
R₁, R₂: —CH₃
Pigment example (34)
A₁, A₂: 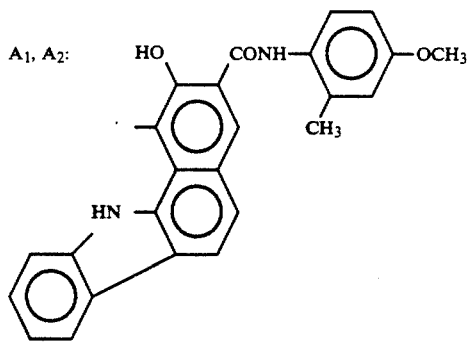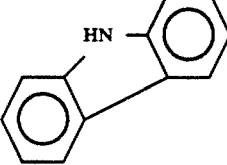
Ar₁, Ar₂: 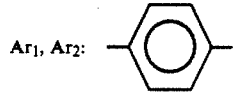
R₁, R₂: —CH₃
Pigment example (35)

$A_1, A_2$: 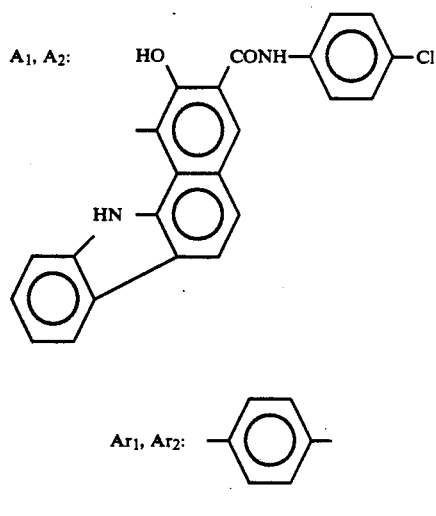
$Ar_1, Ar_2$: 
$R_1, R_2$:  —CH₃
Pigment example (36)
$A_1$: 
$A_2$: 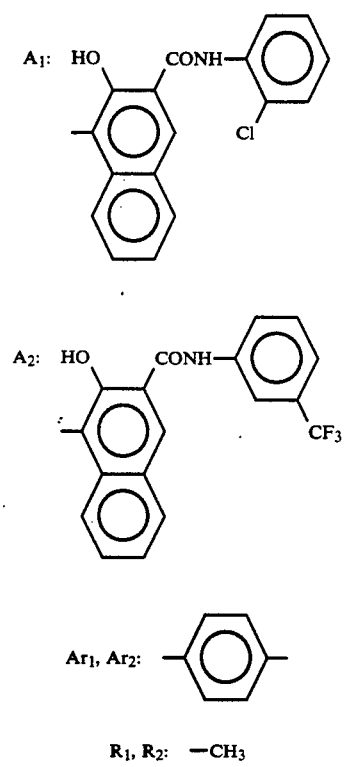
$Ar_1, Ar_2$: 
$R_1, R_2$:  —CH₃
Pigment example (37)
$A_1$: 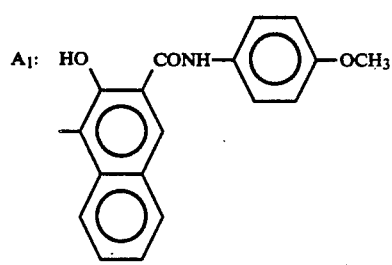
$A_2$: 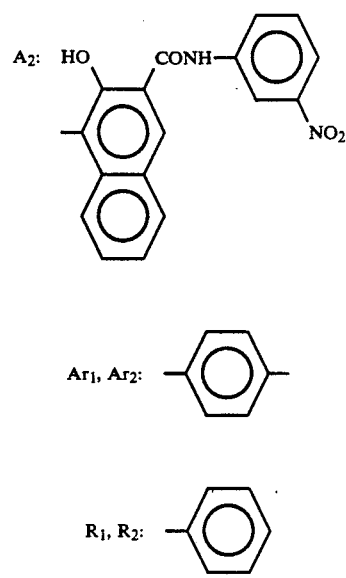
$Ar_1, Ar_2$: 
$R_1, R_2$: 
Pigment example (38)
$A_1$: 
$A_2$: 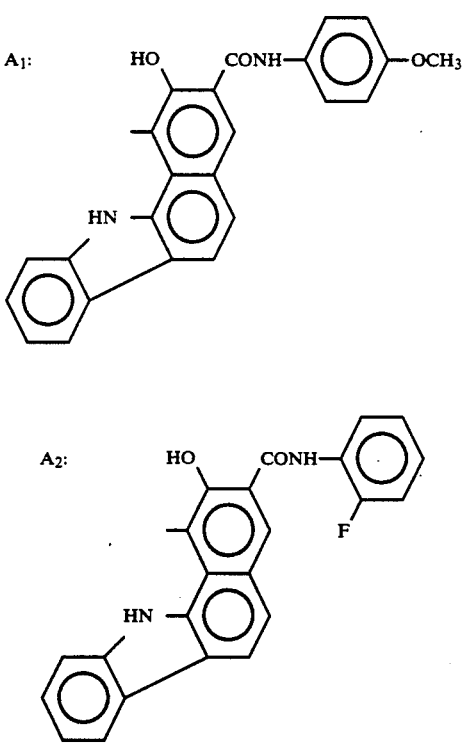
$Ar_1, Ar_2$: 
$R_1, R_2$:  —C₂H₅
Pigment example (39)

-continued
A₁: 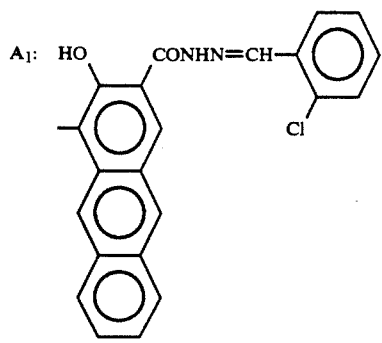
A₂: 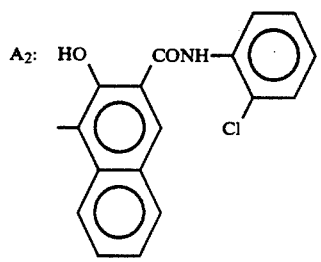
Ar₁: 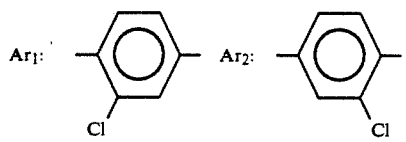 Ar₂:
R₁, R₂: —H
Pigment example (40)
A₁: 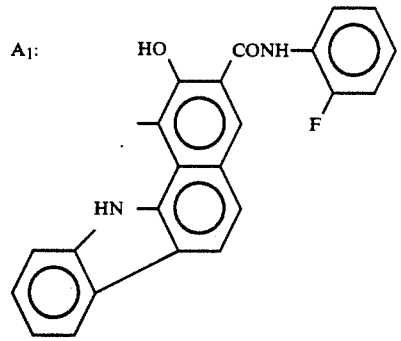
A₂: 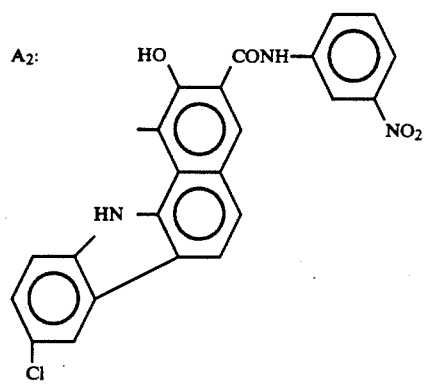
-continued
Ar₁, Ar₂: 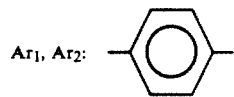
R₁, R₂: —CH₃
Pigment example (41)
A₁: 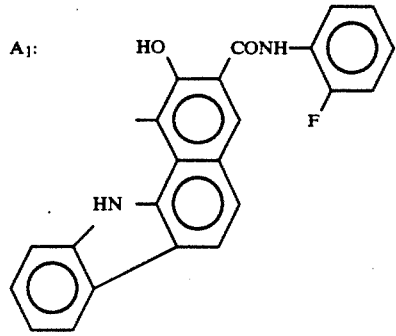
A₂: 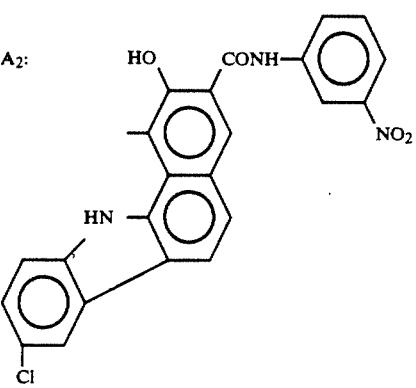
Ar₁, Ar₂: 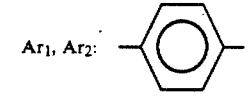
R₁: 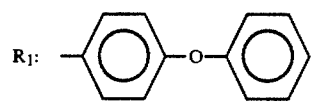
R₂: 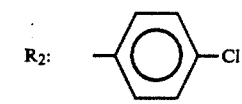
Pigment example (42)
A₁: 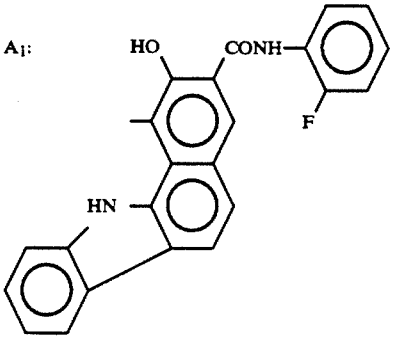

A2: 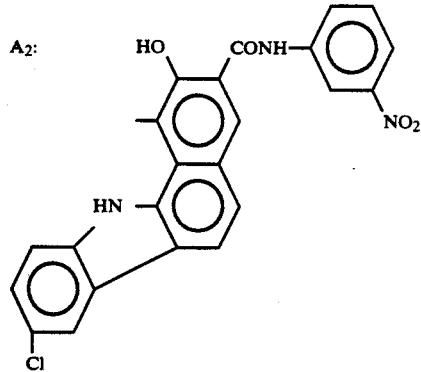

Ar1, Ar2: 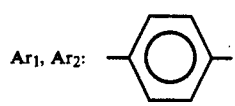

R1: 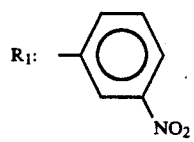

R2: 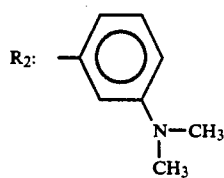

Pigment example (43)

A1: 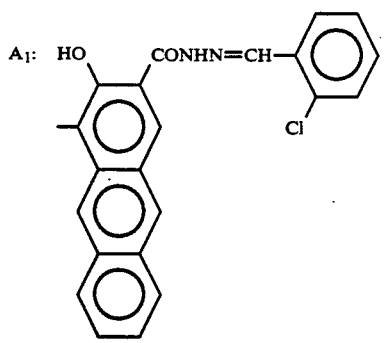

A2: 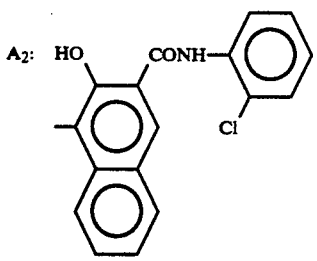

Ar1: 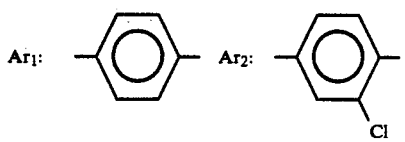 Ar2:

-continued

R1, R2: —H

The disazo pigment expressed by formula (1) and used in the present invention can easily by synthesized by changing a diamine into a tetrazonium salt by a normal method using sodium nitride or nitrosylsulfuric acid and then coupling the tetrazonium salt to a coupler in an aqueous solution int he presence of an alkali. Alternatively, the disazo pigment can be formed by converting a tetrazonium salt into a stable salt, such as boro-fluoride salt or a zinc chloride complex salt, and then coupling it to a coupler in an organic solvent, such as N,N-dimethylformamide or dimethylsulfoxide, in the presence of a base, such as sodium acetate, triethylamine or N-methylmorpholine.

In a case where $A_1$ and $A_2$ in formula (1) are different from each other, the disazo pigment expressed by formula (1) can be synthesized first by coupling one mol of tetrazonium salt to one mol of one of the couplers and then coupling the tetrazonium salt to one mol of the other coupler. Alternatively, one of the amino groups of the diamine is protected by an acetyl group, diazotized and then coupled to one of the couplers. Thereafter, hydrolysis of the protected group is carried out using hydrochloric acid or the like, and that protected group is then diazotized and coupled to the other coupler.

It is, however, to be noted that the methods of synthesizing the disazo pigment used in the present invention are not limited to the aforementioned ones.

An example of the method of synthesizing the pigment example (2) is shown below.

(SYNTHESIS EXAMPLE)

A 300 ml beaker was charged with 150 ml of water, 20 ml (0.23 mol) of thick hydrochloric acid and 9.29 g (0.032 mol) of

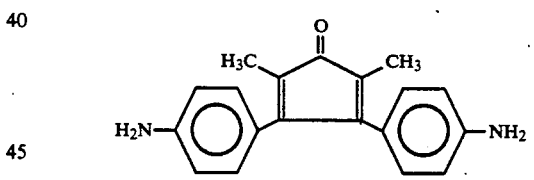

The mixture was cooled down to 4° C. Thereafter, a solution obtained by dissolving 4.6 g (0.067 mol) of sodium nitride in 10 ml of water was dripped into the cooled mixture over ten minutes. During the dripping, the temperature of the solution was kept at 5° C. Then, the mixture was stirred for fifteen minutes and then carbon filtered. To this mixture was added a solution obtained by dissolving 10.5 g (0.096 mol) of sodium boro-fluoride in 90 ml of water. The mixture was stirred and precipitated boro fluoride salt was filtered and rinsed with cold water. The boro fluoride salt was further scrubbed with acetonitrile, followed by drying at room temperature under reduced pressure.

The yield was 12.2 g and the yield ratio 78%.

Next, 500 ml of N,N-dimethylformamide (DMF) was charged in a 1000 cc beaker, and a compound represented by the following formula was dissolved in an amount of 12.5 g (0.042 mol).

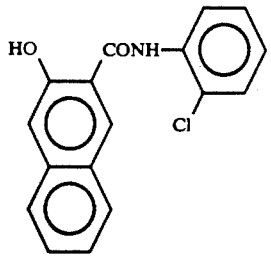

After the solution was cooled to 5° C., 9.76 g (0.020 mol) of the boro-fluoride salt mentioned before was dissolved in this solution. Next, 5.1 g (0.050 mol) of triethylamine was dripped over five minutes. After stirring for two hours, precipitated pigment was filtered and scrubbed, and rinsed four times with DMF and three times with water, followed by freeze-drying.

The yield and the yield ratio were 12.5 g and 74.7%, respectively.

The result of an element analysis is shown in the following table:

|   | Calculated value (%) | Measured value (%) |
|---|---|---|
| C | 76.06 | 75.97 |
| H | 4.34 | 4.40 |
| N | 10.04 | 10.05 |

In the present invention, the photosensitive layer in which a compound expressed by formula (1) is present, has any of the following configurations. In the following examples, the layer placed in advance of the stroke represents the lower layer, and the layer placed behind the stroke represents the upper layer.

(1) A layer (a charge generating layer) in which a charge generating substance is present / a layer (a charge transporting layer) in which a charge transporting substance is present (2) A charge transporting layer / a charge generating layer (3) A layer in which both a charge generating substance and a charge transporting substance are present Of course, the structure of the photosensitive layer according to the present invention is not limited to the aforementioned ones and any other structure can be employed.

The individual layers will be described below in detail.

The charge generating layer can be formed by applying to the conductive supporting member a coating liquid in which the disazo pigment expressed by formula (1) and a binder resin are dispersed in an adequate solvent. Preferably, the charge generating layer has a thickness of, for example, 5 microns or less, more preferably, 0.1 to 1 micron.

The binder resin that can be used together with the disazo pigment may be an insulating resin or an organic photoconductive polymer. Examples of such resins and polymers include polyvinyl butyral, polyvinyl benzal, polyarylates, polycarbonates, polyesters, phenoxy resins, cellulose resins, acrylic resins and urethane resins. The binder resin may be used in an amount which is 80 percent by weight or less, more preferably, 40 percent by weight or less, relative to the total weight of the charge generating layer.

The solvent may be selected from the substances which dissolve the binder resin. Examples of such substances include ethers such as tetrahydrofuran or 1, 4 - dioxane; ketones such as cyclohexanone or methyl ethyl ketone; amides such as N, N - dimethylformamide; esters such as methyl acetate or ethyl acetate; aromatic compounds such as toluene, xylene or chlorobenzene; alcohols such as methanol, ethanol or 2 - propanol; and aliphatic hydrocarbons such as chloroform, methylene chloride dichloroethylene, carbon tetrachloride or trichloroethylene. It is, however, desirable that any solvent which does not dissolve the charge transporting layer or an undercoating layer, which will be described later, be selected.

The disazo pigment used in the present invention may be in an amorphous or crystalline state. Combinations of two or more disazo pigments expressed by formula (1) or combinations of the disazo pigment and any known charge generating substance may also be used.

The charge transporting layer is laminated on or under the charge generating layer, and has the function of receiving charge carriers from the charge generating layer in the presence of an electric field and transporting them onto the surface thereof.

The charge transporting layer is formed by applying a coating liquid in which a charge transporting substance, together with a desired binder resin, is dissolved in a solvent. Preferably, the charge transporting layer has a thickness from 5 to 40 microns, and more preferably, from 15 to 30 microns.

The charge transporting substance is classified as an electron transporting substance or a positive hole transporting substance. Examples of electron transporting substances include electron absorbing substances, such as 2, 4, 7 - trinitrofluorenone, 2, 4, 5, 7 -tetranitrofluorenone, chloranyl and tetracyanoaurate dimethyl; and polymers of these electron absorbing substances.

Examples of positive hole transporting substances include: polynuclear aromatic compounds, such as pyrene and anthracene; heterocyclic compounds, such as carbazole type compounds; indole type compounds, imidazole type compounds; oxazole type compounds; thiazole type compounds and triazole type compounds; hydrazone type compounds, such as p - diethylaminobenzaldehyde N, N - diphenylhydrazone and N, N - diphenylhydrazine - 3- methylidyne - 9 - ethyl carbazole; styryl type compounds, such as α- phenyl - 4'-N, N - diphenylaminostilbene and 5 - [4 - (di - p -tolylamino) benzylidene]- 5H - dibenzo [a, d] cycloheptene; benzidine type compounds; triarylmethane type compounds; triphenylamine compounds; and polymers having a group derived from any of these compounds as a principal or side chain.

In addition to the above-described organic charge transporting substances, inorganic materials, such as selenium, selenium-tellurium, amorphous silicon or cadmium sulfide, can also be used.

The above-described charge transporting substances can be used alone or in combination.

When the charge transporting substance has no film forming property, it may be used together with an adequate binder. Examples of such binder resins include insulating resins such as acrylic resins, polyallylate, polyester, polycarbonate, polystyrere, acrylonitrile - styrene copolymer, polyacrylamide, polyamide and chlorinated rubber; and organic photoconductive polymers such as poly-N-vinylcarbazole and polyvinyl anthracene.

The electrophotographic photosensitive member according to the present invention may also have a so-called single-layer type photosensitive layer in which both the disazo pigment expressed by formula (1) and the charge transporting substance are present. In this case, a charge moving complex, which may be a combination of poly-N-vinylcarbazole and trinitrofluorenone, may also be used as the charge transporting substance.

In the electrophotographic photosensitive member according to the present invention, a resin layer which serves as a protective layer to mechanically or chemically protect the photosensitive layer or a resin layer in which conductive particles or a charge transporting substance is present, may also be provided.

The conductive substrate of the electrophotographic photosensitive member may be formed from, for example, aluminum, aluminum alloy, copper, zinc, stainless steel, vaandium, molybdenum, chromium, titanium, nickel, indium, gold or platinum. Alternatively, the conductive supporting member may be formed by coating such a metal or alloy on a sheet of a plastic (which may be polyethylene, polypropylene, polyvinylchloride, polyethylene terephthalate or acrylic resin) by vacuum deposition, by coating, together with an adequate binder resin, conductive particles on a plastic or metal substrate, or by impregnating a plastic or a sheet of paper with conductive particles.

The conductive substrate may have a drum-, sheet-, or belt-like shape.

An undercoating layer which acts as a barrier and which also has a binding function may be provided between the conductive substrate and the photosensitive layer.

The undercoating layer may be formed of casein, polyvinyl alcohol, nitrocellulose, polyamide (such as nylon 6, nylon 66, nylon 610, copolymerized nylon or alkoxymethyl nylon), polyurethane or aluminum oxide.

The thickness of the undercoating layer is preferably 5 microns or less, more preferably, between 0.1 and 3 microns.

In the formation of each layer mentioned above, suitable organic solvents may be used, and the layer can be formed by coating methods such as dip coating, spray coating, beam coating, roller coating, Mayer bar coating, and blade coating.

The electrophotographic photosensitive member according to the present invention can be used in an electrophotographic copier and in electrophotographic applied fields including a facsimile, a laser beam printer, a CRT printer, a LED printer, a liquid crystal printer and a laser process.

FIG. 1 schematically shows a transfer type electrophotographic apparatus which employs the electrophotographic photosensitive member according to the present invention.

In the electrophotographic apparatus shown in FIG. 1, a drum type photosensitive member 1, which is an image carrying member, can be rotated about an axis 1a in the direction indicated by the arrow at a predetermined circumferential speed. The circumferential surface of the photosensitive member 1 is uniformly charged to a predetermined positive or negative level by a charging means 2 during the rotation. Next, the charged surface is subjected to radiation L (which may be a light obtained by slit exposure or a laser beam which scans the surface of the drum) which is emitted from an exposure means (not shown) to form an electrostatic latent image corresponding to the radiation L on the circumferential surface of the photosensitive member. The electrostatic latent image is formed on the surface of the photosensitive member successively as the photosensitive member is rotated.

The electrostatic latent image formed is developed using toner by a developing means 4, and the thus-obtained toner image is transferred onto the surface of a transfer material P successively, which is fed to the space between the photosensitive member 1 and a transfer means 5 from a paper feeding section (not shown) in synchronism with the rotation of the photosensitive member 1, by means of the transfer means 5.

The transfer material P onto which the toner image has been transferred is separated from the surface of the photosensitive member and then fed to a toner image fixing means 8 so as to fix the toner image onto the surface of the transfer material P. The resultant sheet of paper is fed out of a machine as a copy.

The toner remaining on the surface of the photosensitive member 1, when the transfer process has been completed, is removed by a cleaning means 6 so as to ready the photosensitive member for use in a subsequent image forming cycle. The member is discharged by pre-exposure means 7.

A corona charger is generally used as the means 2 for uniformly charging the photosensitive member 1. Also, a corona transfer means is typically used as the transfer means 5. The electrophotographic apparatus may be constructed such that a Plurality of components, including the photosensitive member, the developing means and the cleaning means, are formed as one unit and that unit is made detachable with respect to the body. For example, the photosensitive member and at least one component selected from the charging means, the developing means and the cleaning means may be formed as one unit which can be mounted on or detached from the body by means of a guide means such as a rail provided in the body. At that time, the single unit may include the charging means and/or the developing means.

In a case where the electrophotographic apparatus is used as a copying machine or a printer, the radiation L may be, for example, a light reflected by or passed through an original document; a laser beam scanned in accordance with a signal obtained by reading the original document by means of a sensor; a light emitted from a light-emitting diode driven in accordance with the above signal; or a light emitted from a liquid crystal shutter array driven in accordance with the above signal.

Figure 2:
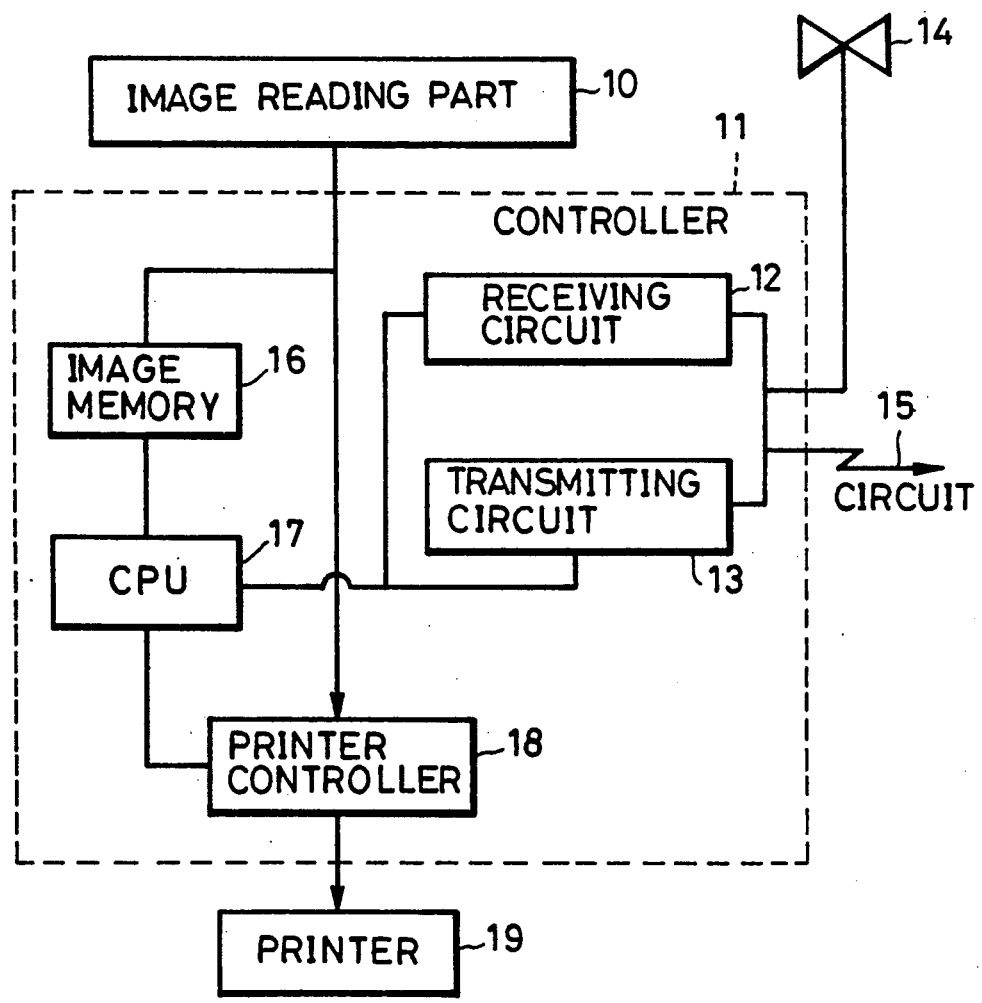
FIG. 2 is a block diagram of a facsimile having an electrophotographic photosensitive member according to the present invention.

In a case where the electrophotographic apparatus is employed as a printer for a facsimile, the radiation L represents the light employed to print out data received by the facsimile. FIG. 2 ia a block diagram of an electrophotographic apparatus which is used as the printer for a facsimile.

A controller 11 controls both an image reading unit 10 and a printer 19. The controller 11 is controlled by a central processing unit (CPU) 17. The data read by the image reading unit 10 is transmitted to a remote terminal through a transmission circuit 13. The data received from a remote terminal is sent to the printer 19 through a reception or receiving circuit 12. An image memory stores a predetermined amount of image data. A printer controller 18 controls the printer 19. A reference numeral 14 denotes a telephone.

The data received through a communication line 15 (from the remote terminal connected to this facsimile machine through the communication line) is demodulated by the reception circuit 12 The CPU 17 decodes the demodulated image information and stores the decoded information in the image memory 16. Once the image information corresponding to one page has been stored in the image memory 16, recording of that image is performed, the CPU 17 reads out the image information corresponding to one page from the image memory 16 and sends the decoded information to the printer controller 18. Upon receipt of the image information corresponding to one page from the CPU 17, the printer controller 18 controls the printer 19 so that recording of the image information can be performed.

The CPU 17 receives image information representing a subsequent page while the printer 19 is recording the image information.

Reception and recording of an image are thus performed.

The following examples illustrate certain preferred embodiments of the invention and are not meant to limit its scope.

EXAMPLE 1

A solution was prepared by dissolving, in 95 g of methanol, 5 g of methoxymethylated nylon (weight average molecular weight 32,000) and 10 g of alcohol soluble copolymer nylon (weight average molecular weight 29,000). The solution was applied with a Mayer bar to the surface of an aluminum substrate, thus forming an undercoating layer 1 μm thick after drying.

Next, 5 g of Pigment example (1) was added to a solution obtained by dissolving 2 g of butyral resin (butyralation degree 63 mol%) in 95 g of cyclohexane, and was dispersed by a sand mill for twenty hours. The dispersant was applied to the surface of the abovementioned undercoating layer 0.2 μm thick after drying by means of Mayer bar so as to form a charge generating layer.

Thereafter, a solution obtained by dissolving 10 g of styryl compound expressed by the following formula and 11 g of polycarbonate resin (weight average molecular weight 50,000) in 70 g of chlorobenzene was applied to the surface of the above mentioned charge generating layer 18 μm thick after drying by means of Mayer bar so as to form a charge transporting layer, whereby the electrophotographic photosensitive member was formed.

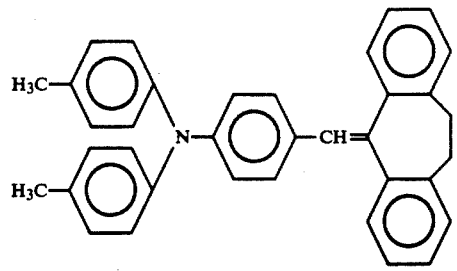

The thus obtained electrophotographic photosensitive member was tested using an electrostatic copying paper tester (Model SP-428, manufactured by Kawaguchi Denki Kabushiki Kaisha) More specifically, the electrophotographic photosensitive member was subjected to corona charging to −5KV, held in a dark place for one second, and then exposed to radiation of 10 lux which was emitted by a halogen lamp.

The charging characteristics of the electrophotographic photosensitive member were evaluated both in terms of the surface potential $V_0$ and the amount of radiation required to reduce the surface potential after the dark preservation to one half (E1/2), i.e., the sensitivity.

The results of the evaluation are shown in Table 1.

EXAMPLES 2 to 12

Electrophotographic photosensitive members were manufactured in the same process as that of Example 1 with the exception that Pigment examples listed in Table 1 were used in place of Pigment example (2). The manufactured members were evaluated in the same manner as that of Example (1).

The results of the evaluation are also shown in Table 1.

TABLE 1

| Example | Pigment Example | $V_O(-V)$ | E ½ (lux · sec) |
|---------|-----------------|-----------|-----------------|
| 1       | (2)             | 698       | 0.97            |
| 2       | (3)             | 700       | 0.94            |
| 3       | (4)             | 697       | 0.99            |
| 4       | (8)             | 701       | 1.31            |
| 5       | (10)            | 696       | 1.40            |
| 6       | (15)            | 700       | 1.11            |
| 7       | (18)            | 701       | 1.21            |
| 8       | (22)            | 699       | 0.97            |
| 9       | (23)            | 697       | 0.91            |
| 10      | (26)            | 695       | 0.87            |
| 11      | (32)            | 700       | 1.87            |
| 12      | (38)            | 701       | 0.90            |

COMPARISON EXAMPLES 1 to 4

Using the following Comparison pigments (A) to (D), electrophotographic photosensitive members were manufactured in the same process as that of Example 1. The manufactured photosensitive members were evaluated in the same manner as that of Example 1. The results of the evaluation are shown in Table 2.

Comparison pigment (A) (Japanese Patent Laid-Open No. 131539/1985)

-continued

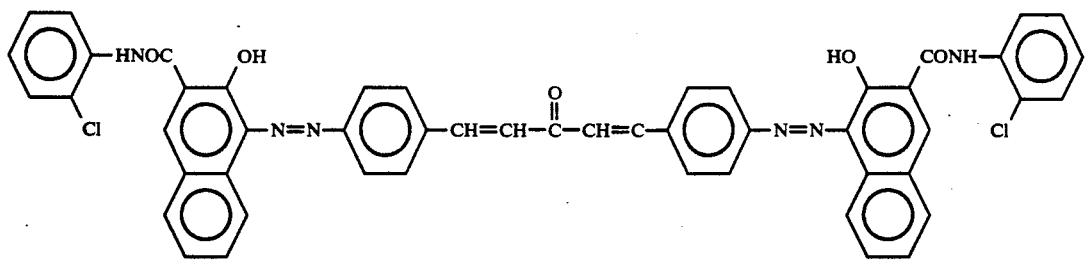

Comparison pigment (B) (Japanese Patent Laid-Open No. 24261/1988)

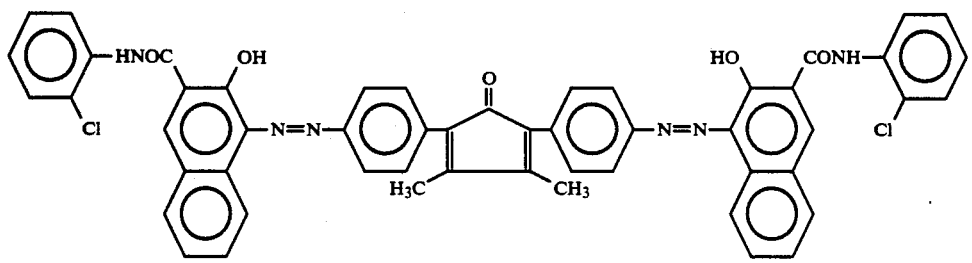

Comparison pigment (C) (Japanese Patent Laid-Open No. 215556/1986)

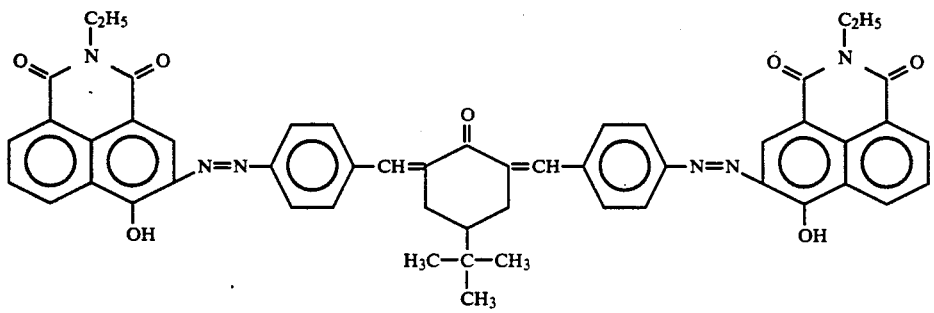

Comparison pigment (D) (Japanese Patent Laid-Open No. 22834/1979)

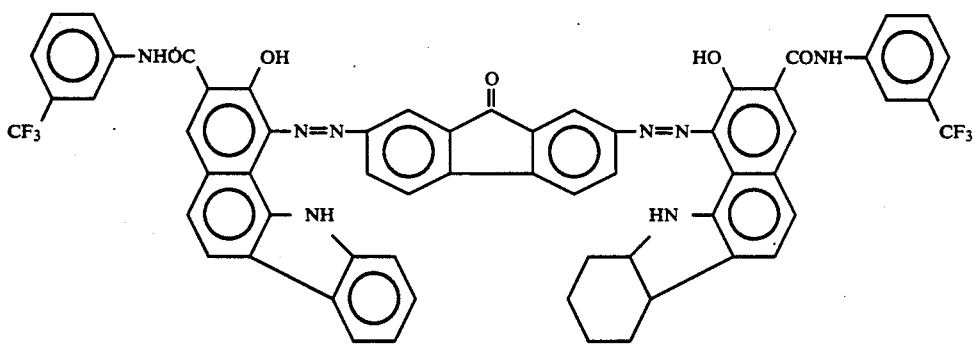

TABLE 2

| Comparison Example | Comparison Pigment | $V_O(-V)$ | $E\frac{1}{2}$ (lux · sec) |
|---|---|---|---|
| 1 | (A) | 698 | 4.2 |
| 2 | (B) | 696 | 3.8 |
| 3 | (C) | 701 | 3.9 |
| 4 | (D) | 690 | 3.8 |

EXAMPLE 13

The electrophotographic photosensitive member of Example 1 was adhered to a cylinder of an electrophotographic copying apparatus including a corona charger of −6.5KV, an exposure optical system, a developing unit, a transfer charger, a charge-removing optical system, and a cleaner.

The initial dark potential $V_D$ and the initial bright potential $V_L$ were respectively set to about −700V and −200 V, and variations ($\Delta V_D$) in the dark potential and variations ($\Delta V_L$) in the bright potential after 5,000 copying cycles were measured for evaluation of the durability. Results of the evaluation are shown in Table 3.

In Table 3, the minus sign (1) represents a reduction in the absolute value of the potential, and the plus sign (+) indicates an increase in the absolute value of the potential.

EXAMPLES 14 to 22

Durability of the electrophotographic photosensitive members manufactured in Examples 2, 3, 5, 7 to 11 and 12 was evaluated in the same manner as that of Example 21. The results of the evaluation are shown in Table 3.

TABLE 3

| Example | $\Delta V_D$ (V) | $\Delta V_L$ (V) |
|---|---|---|
| 13 | −1 | +4 |
| 14 | −10 | +2 |
| 15 | −11 | +10 |
| 16 | +1 | +9 |
| 17 | −11 | +7 |
| 18 | −5 | +11 |
| 19 | +4 | +4 |
| 20 | −7 | −1 |
| 21 | −9 | +4 |
| 22 | −5 | +2 |

COMPARISON EXAMPLES 5 to 8

Durability characteristics of the electrophotographic photosensitive members obtained in Comparison Examples 1 to 4 were evaluated in the same manner as that of Example 21.

The results of the evaluation are shown in Table 4.

TABLE 4

| Comparison Example | $\Delta V_D$ (V) | $\Delta V_L$ (V) |
|---|---|---|
| 5 | −64 | +70 |
| 6 | −30 | +19 |
| 7 | −90 | +94 |
| 8 | −41 | +39 |

EXAMPLE 23

An undercoating layer of polyvinyl alcohol was formed 1.0 μm thick on a surface of an aluminum deposited polyethylene terephthalate film. A dispersant of disazo pigment used in Example 1 was coated 0.1 μm thick on this undercoating layer by means of Mayer bar and dried so as to form a charge generating layer.

Next, a solution obtained by dissolving 5 g of biphenyl compound having the following formula and 5 g of polycarbonate resin (weight average molecular weight 50,000) in 40 g of tetrahydrofuran was coated 20 μm thick on the charge generating layer and dried to form a charge transporting layer.

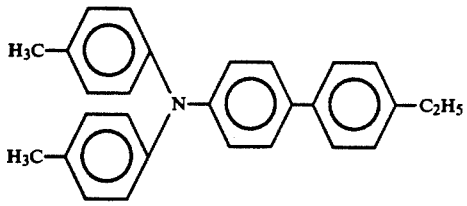

charging characteristics and durability of the thus-obtained electrophotographic photosensitive member were evaluated int he same manner as that of Examples 1 to 21. The results of the evaluation are as follows:

$V_0$: −698V
E1/2 : 0.85 lux·sec
$\Delta V_D$: −4V
$\Delta V_L$: +2V

EXAMPLE 24

An electrophotographic photosensitive member was manufactured by forming the charge generating layer and charging transporting layer int he reverse order of that of Example 11, and charging characteristics of the thus-obtained electrophotographic photosensitive member were evaluated in the same manner as that of Example 1. In this case, however, charging provided positive potentials.

$V_0$: +694V
E1/2: 1.2 lux·sec

EXAMPLE 25

A solution obtained by dissolving 5 g of 2,4,7-trinitro-9-fluorenone and 5 g of poly-4,4'-dioxidiphenyl-2,2-propane carbonate (weight average molecular weight 30,000) in 50 g of tetrahydrofuran was coated on the charge generating layer formed in Example 8 by means of Mayer bar and dried to form a charge transporting layer of 18 μm thick, by means of which an electrophotographic photosensitive member was manufactured.

Charging characteristics of the thus-obtained electrophotographic photosensitive member were evaluated in the same manner as that of Example 1. In this case, however, charging provided positive potentials.

$V_0$: +678V
E1/2: 4.0 lux·sec

EXAMPLE 26

0.5 of Pigment example (20) was dispersed in 9.5 g of cyclohexanone for five hours by means of a paint shaker. A solution obtained by dissolving 5 g of the charge transporting material used in Example 1 and 5 g of polycarbonate resin (weight average molecular weight 50,000) in 40 g of tetrahydrofuran was added to the dispersant, and the mixture was further shaken. The thus-prepared coating liquid was applied to the aluminum substrate of 20 μm thick and dried to form a photosensitive layer, whereby an electrophotographic member was manufactured.

Charging characteristics of the thus-obtained electrophotographic photosensitive member were evaluated in the same manner as that of Example 1. In this case, however, charging provided positive potentials.

$V_0$: +690V
E1/2: 3.7 lux·sec

What is claimed is:

1. An electrophotographic photosensitive member comprising a conductive substrate and a photosensitive layer laid thereon, said photosensitive layer containing a compound represented by the following formula (1):

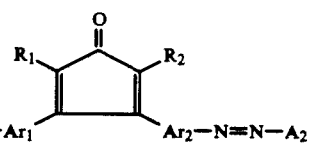

wherein $Ar_1$ and $Ar_2$ are the same or different and are each a substituted or unsubstituted bivalent carbocyclic aromatic group or a substituted or unsubstituted bivalent heterocyclic aromatic group; $R_1$ and $R_2$ are each a hydrogen atom, a substituted or unsubstituted alkyl group, a substituted or unsubstituted aralkyl group or a substituted or unsubstituted aryl group; and $A_1$ and $A_2$ are each a coupler residue having a phenolic hydroxyl group, wherein $A_1$ and $A_2$ are the same or different 2. The electrophotographic photosensitive member according to claim 1, wherein said $A_1$ and $A_2$ are each a residue selected from a group consisting of the groups represented by the following formulas (2) to (6):

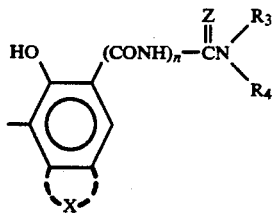

Formula (2)

wherein X is a residue forming a polycyclic aromatic ring or a heterocyclic ring with a benzene ring; Z is an oxygen or sulfur atom; $R_3$ and $R_4$ are the same or different and are each a hydrogen atom, a substituted or unsubstituted alkyl group, a substituted or unsubstituted aryl group, a substituted or unsubstituted aralkyl group or a substituted or unsubstituted heterocyclic group and $R_3$ and $R_4$ together are bonded to form a cyclic amino group having a nitrogen atom in its ring; and n is either 0 or 1,

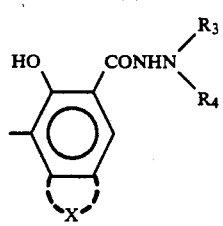

Formula (3)

wherein X, $R_3$ and $R_4$ are the same as in Formula (2)

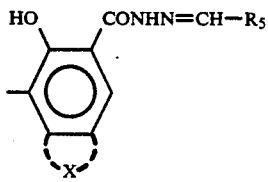

Formula (4)

wherein X is the same as above; and $R_5$ is a hydrogen atom, a substituted or unsubstituted alkyl group, a substituted or unsubstituted aryl group, a substituted or unsubstituted aralkyl group or a substituted or unsubstituted heterocyclic group,

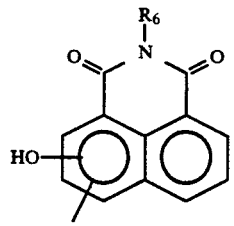

Formula (5)

wherein $R_6$ is the same as $R_5$,

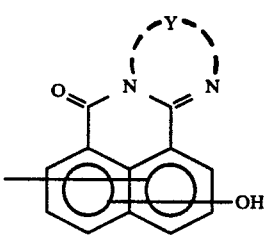

Formula (6)

wherein Y is a substituted or unsubstituted bivalent aromatic hydrocarbon group, or a substituted or unsubstituted bivalent heterocyclic group which has a nitrogen atom in its ring.

3. The electrophotographic photosensitive member according to claim 2, wherein said $A_1$ and $A_2$ are selected from one of Formulas (2) to (4).

4. The electrophotographic photosensitive member according to claim 3, wherein said X is a residue forming a benzocarbazole with a benzene ring.

5. The electrophotographic photosensitive member according to claim 1, wherein said photosensitive layer comprises a charge generating layer and a charge transporting layer.

6. The electrophotographic photosensitive member according to claim 5, wherein said charge transporting layer is disposed on said charge generating layer.

7. The electrophotographic photosensitive member according to claim 5, wherein said charge generating layer is disposed on said charge transporting layer.

8. The electrophotographic photosensitive member according to claim 1, wherein said photosensitive layer is a single layer.

9. The electrophotographic photosensitive member according to claim 1, wherein an undercoating layer is disposed between said conductive substrate and said photosensitive layer.

10. The electrophotographic photosensitive member according to claim 1, wherein a protective layer is disposed on said photosensitive layer.

* * * * *

UNITED STATES PATENT AND TRADEMARK OFFICE
CERTIFICATE OF CORRECTION

PATENT NO. : 5,137,794
DATED : August 11, 1992
INVENTOR(S) : TOSHIHIRO KIKUCHI

It is certified that error appears in the above-identified patent and that said Letters Patent is hereby corrected as shown below:

COLUMN 4

Line 26, "3-pyridirediyl," should read --3-pyridinediyl,--.
Line 57, "carbazcle," should read --carbazole,--.

COLUMN 22

Line 5, "by" should read --be--.
Line 9, "int he" should read --in the--.
Line 56, "boro fluoride" should read --boro-fluoride--.
Line 57, "boro fluoride" should read --boro-fluoride--.
Line 61, "ratio" should read --ratio was--.

COLUMN 24

Line 7, "chlorcbenzene" should read --chlorobenzene--.
Line 41, "compounds," should read --compounds;--.
Line 64, "polystyrere," should read --polystyrene,--.

COLUMN 25

Line 18, "vaandium," should read --vanadium,--.

COLUMN 26

Line 29, "Plurality" should read --plurality--.

COLUMN 27

Line 2, "circuit 12" should read --circuit 12.--.
Line 31, "¶ 1 µm" should read --1 µm--.
Line 32, "Pigment" should read --pigment--.

UNITED STATES PATENT AND TRADEMARK OFFICE
CERTIFICATE OF CORRECTION

PATENT NO. : 5,137,794
DATED : August 11, 1992
INVENTOR(S) : TOSHIHIRO KIKUCHI

It is certified that error appears in the above-identified patent and that said Letters Patent is hereby corrected as shown below:

COLUMN 27

Line 43, "chlorcbenzene" should read --chlorobenzene--.
Line 44, "above mentioned" should read --above-mentioned--.

COLUMN 28

Line 17, "Kaisha)" should read --Kaisha).--.
Line 33, "Pigment" should read --pigment--.
Line 34, "Pigment" should read --pigment--.

COLUMN 29

Line 41, "NHOC" should read --HNOC--.

COLUMN 31

Line 8, "21" should read --13--.
Line 28, "21" should read --13--.
Line 62, "charging" should read --Charging--.
Line 64, "int he" should read --in the--.

COLUMN 32

Line 6, "int he" should read --in the--.
Line 28, "$V_0$:+678V" should read --$V_0$:+675V--.

UNITED STATES PATENT AND TRADEMARK OFFICE
CERTIFICATE OF CORRECTION

PATENT NO. : 5,137,794

DATED : August 11, 1992

INVENTOR(S) : TOSHIHIRO KIKUCHI

It is certified that error appears in the above-identified patent and that said Letters Patent is hereby corrected as shown below:

COLUMN 33

Line 2, "different" should read --different.--.

Signed and Sealed this

Twenty-fifth Day of January, 1994

Attest:

BRUCE LEHMAN

Attesting Officer     Commissioner of Patents and Trademarks